(12) United States Patent
Cottrell

(10) Patent No.: US 6,494,242 B2
(45) Date of Patent: Dec. 17, 2002

(54) RUNFLAT TIRE HAVING OPTIMIZED CARCASS PATH

(75) Inventor: Roger Cary Cottrell, Simpsonville, SC (US)

(73) Assignee: Michelin Recherche et Technique, Granges-Paccot (CH)

( * ) Notice: Subject to any disclaimer, the term of this patent is extended or adjusted under 35 U.S.C. 154(b) by 83 days.

(21) Appl. No.: 09/756,834

(22) Filed: Jan. 9, 2001

(65) Prior Publication Data

US 2001/0001971 A1 May 31, 2001

Related U.S. Application Data

(63) Continuation of application No. PCT/US99/11812, filed on May 27, 1999.

(51) Int. Cl.[7] .......................... B60C 3/00; B60C 15/00; B60C 15/02; B60C 15/05; B60C 17/00
(52) U.S. Cl. ..................... 152/454; 152/516; 152/517; 152/539; 152/540; 152/543; 152/545; 152/546; 152/547; 152/548; 152/550
(58) Field of Search .................. 152/545, 517, 152/454, 516, 540, 543, 547, 550, 546, 548, 539

(56) References Cited

U.S. PATENT DOCUMENTS

| | | | |
|---|---|---|---|
| 4,287,924 A | | 9/1981 | Deck et al. |
| 4,365,659 A | * | 12/1982 | Yoshida et al. ......... 152/517 X |
| 5,058,646 A | | 10/1991 | Kajikawa et al. |
| 5,263,526 A | | 11/1993 | Oare et al. |
| 5,427,166 A | | 6/1995 | Willard, Jr. |
| 5,511,599 A | | 4/1996 | Willard, Jr. |
| 5,660,656 A | | 8/1997 | Herbelleauu et al. |
| 5,879,482 A | | 3/1999 | Rooney et al. |
| 5,968,296 A | * | 10/1999 | Ahouanto ............... 152/545 X |
| 6,142,205 A | * | 11/2000 | Beck, Jr. et al. ........ 152/550 X |

FOREIGN PATENT DOCUMENTS

| | | |
|---|---|---|
| EP | 0542252 A1 | 5/1993 |
| EP | 0475258 B1 | 11/1995 |
| EP | 0787603 A2 | 8/1997 |
| EP | 0590482 B1 | 12/1997 |
| EP | 0810105 A1 | 12/1997 |
| EP | 0822105 A2 | 2/1998 |
| EP | 0842795 A2 | 5/1998 |
| GB | 2053815 A | 2/1981 |
| GB | 2087805 A | 6/1982 |
| JP | 06191238 A * | 7/1994 ............... 152/539 |
| WO | WO 98/56602 | 12/1998 |

* cited by examiner

Primary Examiner—Adrienne C. Johnstone
(74) Attorney, Agent, or Firm—E. Martin Remick; Alan A. Csontos; Martin Farrell

(57) ABSTRACT

The tire of the invention has an optimized path of the outermost carcass designed to maximize the extent of tensile stress in the sidewall and bead portions of the tire. The invention further provides separate reinforcement structures in the bead portion for anchoring the carcass or carcasses in the bead and for retaining the bead on the mounting rim during deflated operation, and said anchoring reinforcement also facilitates the maintenance of the desirable carcass profile.

24 Claims, 7 Drawing Sheets

RUNFLAT TIRE HAVING OPTIMIZED CARCASS PATH

This application is a continuation of International Application No. PCT/US/11812, filed May 27, 1999.

BACKGROUND OF THE INVENTION

The invention relates to a tire, more specifically to a pneumatic tire capable of continued mobility in a deflated condition.

Various tire constructions have been proposed for pneumatic runflat tires, that is; tires which normally operate in an inflated condition but which also permit a limited operation in a deflated condition. These tire constructions are generally formed of one or more generally radial carcasses which are turned up around one or more bead wires arranged in each bead. To obtain the desired mobility in the deflated condition, many of these tires further employ sidewalls which are reinforced and thickened by interposing additional rubber layers between the carcasses or between the carcasses and the tire innerliner. An example of such a reference tire is shown in FIG. 1.

It is also important that a runflat tire remain seated on the rim during deflated operation. Many solutions have been proposed including mechanical bead locks, special rim profiles or bead wire bundles of elongated cross-section. In the last instance as shown in FIG. 1, the elongated bead wire bundle functions both to anchor the carcass in the bead to resist tensile forces developed in the carcass and to retain the bead on the rim seat during deflated operation. This dual function necessitates design compromises.

Tires having carcasses turned up around bead wires necessarily have a discontinuity at the radially uppermost extent of the turned up portion of one or more of the carcasses. When the turned up portion is axially positioned to the exterior of a median axis of the tire cross section, deformation of the bead portion due to loading the tire places the turned up portion in a state of compressive stress. This stress state and the aforementioned discontinuity lead to design constraints resulting in tire performance compromises between the inflated and deflated states.

U.S. Pat. No. 5,263,526 to Oare et al and U.S. Pat. No. 5,511,599 to Willard both relate to runflat tires with multiple carcasses wherein at least one carcass is turned up around bead wires. These references disclose different design solutions to treat the carcass discontinuity. Oare et al disclose a tire with two cord reinforced carcasses, both of which are turned up around the bead wires. At least one carcass turned up portion extends radially to the tire equator, and the lower sidewall portion includes multiple reinforcing plies. In this context, the term "tire equator" defines the radial position corresponding the point of maximum width or axial extent of the exterior surface of the tire. Willard discloses a tire having three cord reinforced carcasses wherein one carcass terminates at the radially and axially inward extent of the bead, the second carcass being turned up around the bead and overlapped by the third carcass in the axially outward portion of the lower sidewall. Neither reference avoids a compressive stress in the turned up portion due to its position at the axially outward side of the bead structure. As a result, the geometry and arrangement of products in the bead region must be adapted to have good durability when these products are subjected to a tensile-compressive cyclic stress. Thus, a tire whose design removes these constraints will yield better overall levels of both inflated and deflated performance.

BRIEF SUMMARY OF THE INVENTION

The tire of the invention has a unique outermost carcass path designed to maximize the extent of tensile stress in the sidewall and bead portions of the tire. The invention further provides a bead portion for anchoring the carcass or carcasses in the bead and for retaining the bead on the mounting rim during deflated operation, and said carcass anchoring also facilitates the maintenance of the desirable carcass profile.

The tire according to the present invention comprises at least one axially outermost carcass anchored in each side of the tire in ; bead, the bead having a base which is intended to be mounted on the tire's design mounting rim, each bead being extended radially upward by a sidewall portion, the sidewall portions joining a tread portion wherein, a median reference profile is defined by the locus of points corresponding to the median position between the axially innermost surface and axially outermost surface of the tire, a rim reference point R in said bead is defined having an axial coordinate equal to one half the nominal width and a radial coordinate equal to one half the nominal diameter of the mounting rim, a bead reference point Z is defined as the intersection of the outermost surface of the tire with a horizontal line offset radially outward a distance from the radial coordinate of the rim reference point R.

a tread reference point N is defined on the outermost surface of the tire at the junction between the tread and sidewall portions of tire, a sidewall reference point P is defined on the outermost surface of the sidewall of the tire and located between said reference points Z and N;

wherein said at least one axially outermost carcass is disposed axially outward of said median reference profile for radial positions between said sidewall reference point P and said tread reference point N, wherein said at least one axially outermost carcass intersects said median reference profile at a point Q, said point Q having a radial position between said reference point Z and said reference point P, and thereafter being disposed axially to the interior of said median reference profile for radial positions inward of said point Q;

wherein each axial coordinate of said at least one axially outermost carcass has a corresponding unique radial coordinate for each radial position inward of said sidewall reference point P, and said tire further comprises a first bead reinforcement for anchoring said at least one carcass in the beads and a second bead reinforcement for providing retention of the beads on the mounting rim in a deflated condition.

The invention just described introduces a unique carcass path defined such that at least the axially outermost carcass first passes axially to the exterior of the median position between the axially innermost and outermost surfaces of the tire from a point at least at the junction of the tread portion with the tire sidewall portions to a specified point above the bead thereafter passing to the interior of the median profile. In this manner the extent of tensile stress in the axially outermost carcass is maximized throughout the sidewall and bead potions of the tire. The carcasses have a radially innermost extent terminating in the bead area without being turned up around bead wires. The carcasses of this invention are anchored in the beads by reinforcements laterally bordering the carcass so as to resist the tension developed in the carcass during inflated or deflated operation of the vehicle. This carcass anchoring reinforcement in the bead can include essentially circumferentially oriented cords or other reinforcements with or without cords. Compared to conventional tires intended for use only in the inflated state, tires intended for extended deflated operation impose additional design constraints to insure retention of the beads on the mounting rim during deflated operation. The present invention introduces a second bead reinforcement positioned axially outward of the carcass anchoring reinforcement of a prescribed geometry to provide adequate retention of the bead on the tire mounting rim during deflated operation, and also to permit easy mounting of the tire on a standard profile rim. The bead retention reinforcement of the invention can include any material suitable to resist the stresses and temperatures during vehicle operation, such as circumferentially oriented cords or filaments, metallic cables, elastomeric materials, fiber reinforced resin matrices and their equivalents.

In a preferred embodiment of the invention the tire has a single radially oriented cord reinforced carcass having a path in the tire sidewall and bead conforming to the teaching relative to the median axis of the tire thickness such that the extent of the sidewall and bead portions of the carcass that remain in tension during inflated or deflated operation is maximized. One or more crescent shaped reinforcing members are disposed in the tire sidewalls between the carcass and the axially innermost surface of the tire so that the tire sidewalls are capable of supporting vehicle forces and moments during deflated operation. To anchor the carcass in each of the beads, the carcass is bordered, on at least one side, in the axial direction by at least one winding of circumferentially oriented cords incorporating a rubber layer interposed between the carcass and the circumferentially oriented carcass anchoring cords. A bead retention reinforcement is located axially outward of the carcass and carcass anchoring reinforcement. A elastomeric bead filler is posed radially outward of the bead retention reinforcement and axially between the carcass and the axially outermost surface of the tire.

In a second embodiment of the invention the tire has at least two carcasses, the first being disposed axially and radially outward from the second carcass. The path of the outermost carcass conforms to the tension maximizing profile of the preferred embodiment. This embodiment has at least two crescent shaped reinforcing members with the first disposed between the first and second carcasses and the second between the second carcass and the radially innermost surface of the tire. In the bead area the two carcasses may have a common circumferential alignment or may follow adjacent circumferential alignments. Carcasses are anchored in the beads by at least one winding of essentially circumferentially oriented cords ax bordering the respective carcass. As in the first embodiment a bead retention reinforcement and an elastomeric bead filler rubber are employed.

In a third embodiment of the invention the tire has at least three carcasses, the first being disposed axially and radially outermost from the second and third carcasses, the third carcass being disposed axially inward from the second carcass. The path of at least the outermost carcass conforms to a tension maximizing profile similar to that of the preferred embodiment. This embodiment has at least three crescent shaped reinforcing members with the first of said members being disposed between the first and second carcasses, the second of said members being disposed between the second and third carcasses, and the third of said members being disposed between the third carcass and the radially innermost surface of the tire. The carcasses are anchored in the bead by at least one winding of essentially circumferentially oriented cords axially bordering the respective carcass. In this embodiment the second and third carcasses have a common circumferential alignment in the bead area, and the cord density of each of the second and third carcass layers is less than that of the first carcass layer. Alternatively, each of the three carcasses may follow adjacent circumferential alignments wherein the respective cord densities are independent of each other. As in the first embodiment a bead retention reinforcement and an elastomeric bead filler rubber are employed.

DETAILED DESCRIPTION OF THE INVENTION

Figure 1:
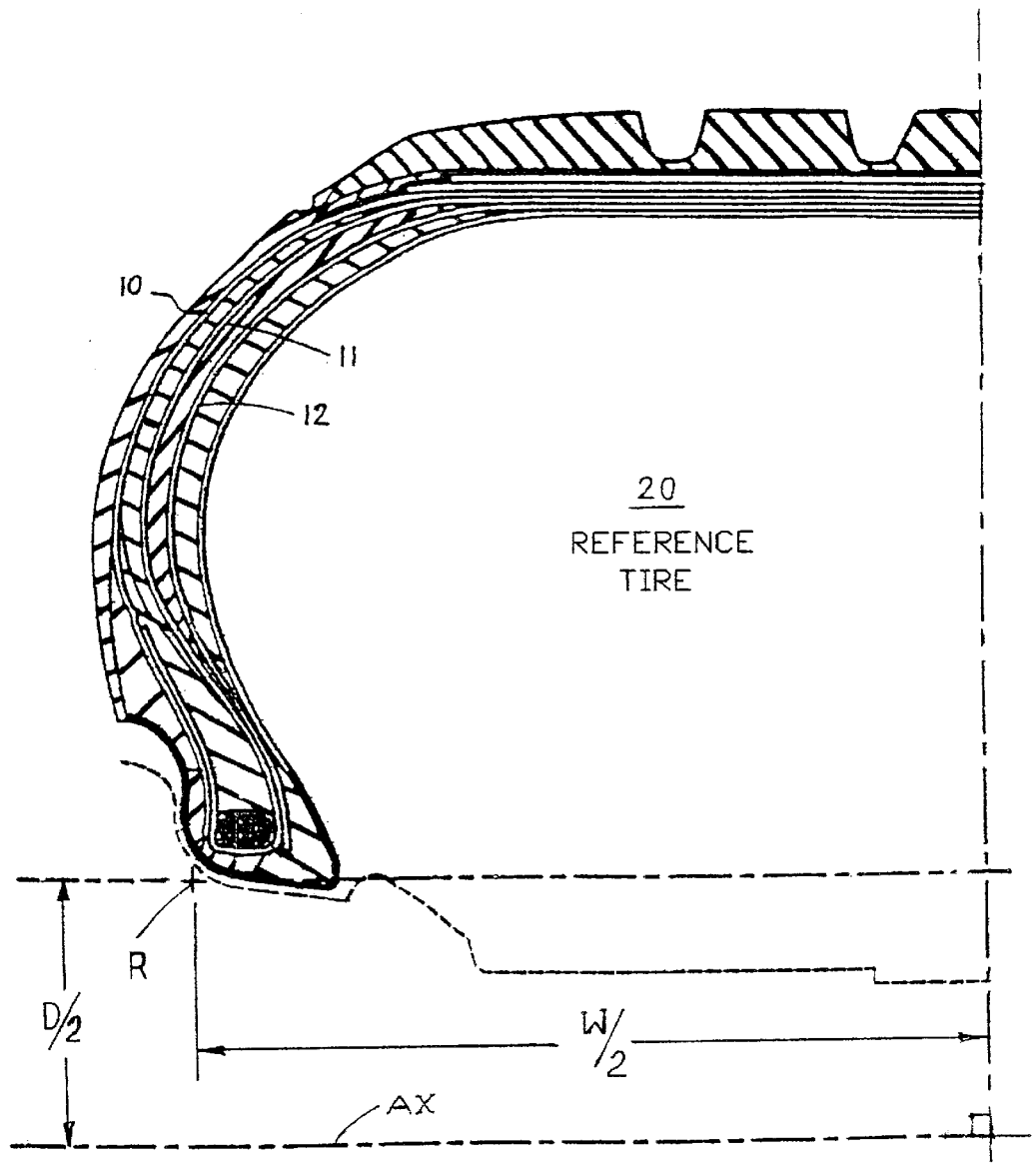
FIG. 1 is a partial cross-section view of a reference tire, taken along a meridian plane through the axis of rotation.

When mounted on a rim and loaded against the ground, tires are subjected to deformations during rolling of the tire, and especially during deflated rolling, which increase or decrease the tension developed in the carcass or carcasses. In the case of conventional designs either the carcass turnup or one or more carcasses may be axially disposed such that the aforementioned deformations cause the carcass to enter a state of compressive stress. This state of compressive stress is likely to occur when a carcass profile, at any location is disposed between the neutral bending axis of that carcass structure and the origin point of the curvature of the neutral axis. Conversely, a carcass profile which is disposed axially and radially outward from the neutral axis and its origin of curvature will be submitted to increased tension during tire deformation. Common materials used for tire carcass reinforcement generally have a higher resistance to cyclic tensile stress than to cyclic compressive stress. For the reference tire 20 shown in FIG. 1, deformation of the tire under rolling, and in particular in deflated rolling, will submit the carcass to compressive stress in the upper sidewall portion of the tire at least in the innermost carcass 12, or in the lower sidewall portion in the outermost carcass 10 or the turned up portion of a second carcass 11. Reduction of these zones of compressive stress can increase the durability of the tire, especially during deflated use. Alternatively, reduction of these zones of compressive stress permits the utilization of carcass reinforcement materials optimized for use under tension with the potential benefit of improved tire performance or reduced tire mass.

The tire of the present invention has a design where compressive stress in the carcass is reduced relative to conventional runflat designs. This result is obtained by having an outermost carcass path disposed so that deformation of the tire under load tends to increase carcass tension in both the sidewall and bead portions of the tire. This result is also obtained without prejudice to the anchoring of the carcass in the bead. This outermost carcass path in the sidewall portion is such that the carcass is disposed axially outward of the neutral axis of the bending in the meridian plane, and in the bead portion the carcass is disposed axially inward of the neutral axis of the bending. At a location near the juncture of the sidewall and bead portions, the carcass profile intersects the neutral axis of bending. The axial and radial positions of the intersection point correspond to a bending transition zone. In the sidewall portion radially outward from the transition zone, deflection of the tire tends to further increase the curvature of the carcass layers. In the lower sidewall and bead portions radially inward from the transition zone, curvature of the carcass layers again increases as the bead portion is constrained to bend about the profile of the mounting rim flange.

The tire of the invention further provides separate structures for anchoring the carcass in the bead and for retaining the bead on the rim. This unique bead structure of the invention permits the tire designer greater design flexibility to insure that all carcasses have paths in the bead area disposed axially inward as far a possible from the neutral axis, while, at the same time, having a bead structure capable of adequate retention of the bead on the rim during deflated use.

Figure 2:
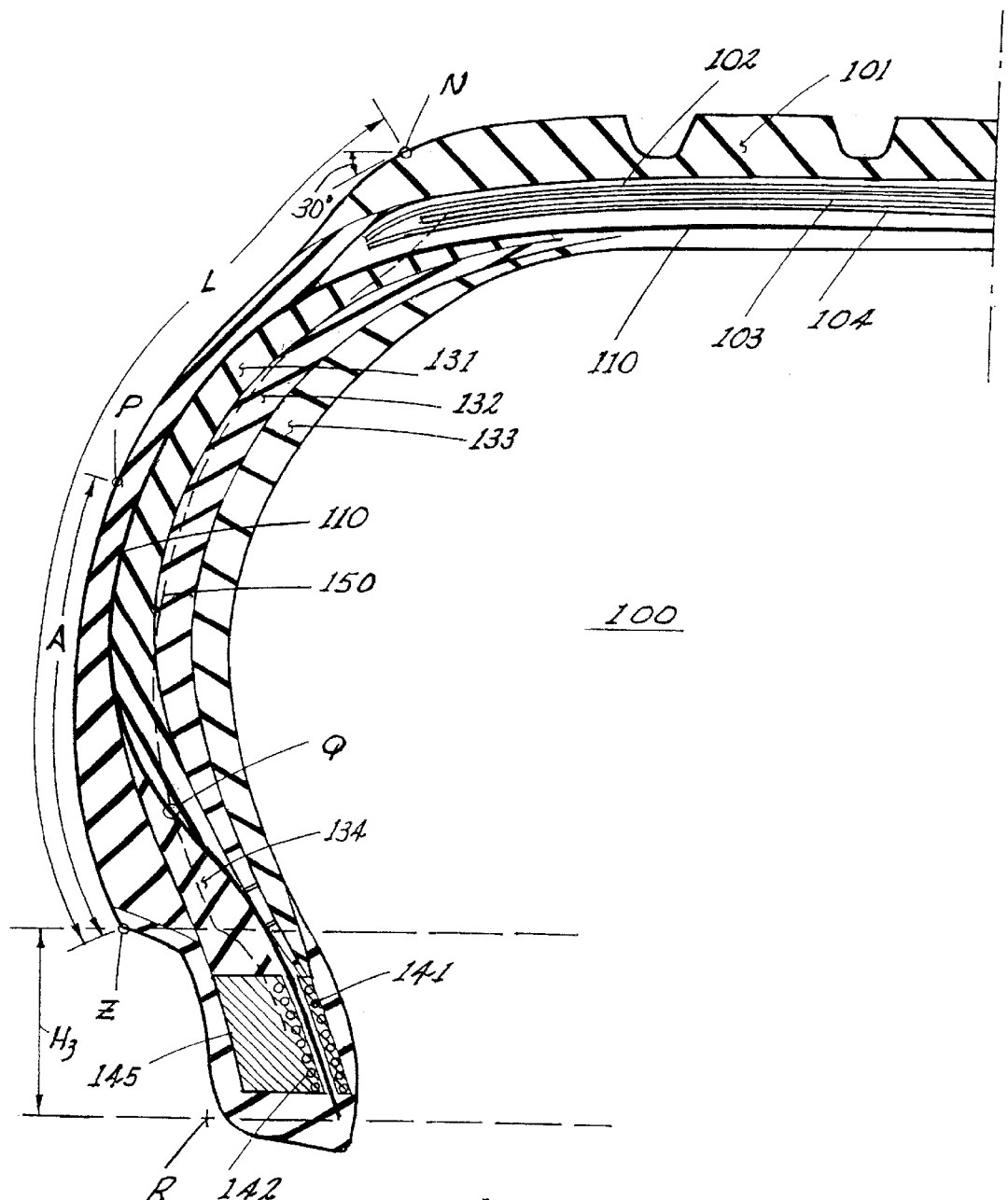
FIG. 2 is a partial cross-section view of a runflat tire corresponding to a preferred embodiment of the invention, taken along a meridian plane through the axis of rotation.

FIG. 2 illustrates a tire 100 made according to the present invention. In the embodiment illustrated in FIG. 2, the tire 100 is a passenger tire provided with a ground engaging tread portion 101 terminating in shoulder portion 105 at the lateral edges of the tread portion. Sidewall portion 106 extends from the shoulder portion 105 radially inward to bead portion 107. The tire 100 is further provided with a carcass 110 which extends from the tread portion 101 through the sidewall portion 106 to the bead portion 107. Carcass 110 is reinforced by essentially radially oriented cords, such as rayon, polyester, steel, aramid or any other material suitable for use as a tire carcass reinforcement. Carcass reinforcements having the highest tensile moduli such as steel or aramid are preferable for use in a tire having a single carcass. These materials are suitable for any of the embodiments disclosed herein, The tire 100 may include a conventional innerliner or other material to form an inner surface 108 of the tire which resists diffusion of air. Disposed radially outward of the carcass 110 and radially inward of the tread portion 101 is a tread reinforcement structure. In the embodiment shown in FIG. 2 this tread reinforcement comprises at least two cord reinforced belts 103 and 104 having cords oriented an angle relative to the mid-circumferential plane of the tire. The belt 103 is disposed such that the cord reinforcement is oriented in a direction opposite to that of belt 104, although not necessarily at the same angle of orientation. An at least third tread reinforcement 102 is disposed radially outward of belt 103 and is reinforced by essentially circumferentially oriented cords.

The radially inwardmost extent of carcass 110 terminates in the bead portion 107 without being turned up around bead cores or other bead reinforcement. That is to say, each axial coordinate defining the profile of carcass 110 has a unique radial position for each radial position less that that of the tire equator. Carcass 110 is anchored in bead portion 107 by at least one winding of circumferentially oriented cords 141 or 142 laterally bordering the carcass 110 on at least one side. In this instance "anchored" in the bead portion means that cord windings 141 or 142 resist the tension developed in carcass 110 during inflated or deflated use of the tire by the adherence of the carcass reinforcing cords laterally with the cord windings rather than being wound around conventional bead cores. Other alternative carcass anchorings or dispositions of the carcass layers in the bead portion have been disclosed in U.S. Pat. No. 5,660,656 to Herbelleauu et al and are incorporated by reference herein. A supplemental winding 145 of essentially circumferentially oriented cords is disposed axially outward of carcass 110 to retain the bead on the tire mounting rim during inflated and deflated use of the tire. In the embodiment illustrated in FIG. 2, sidewall portion 106 is further comprised of three crescent shaped reinforcing members 131,132, and 133 disposed axially between carcass 110 and the innermost surface 108 of the tire. Crescent shaped reinforcing members 131,132 and 133 may comprise the same or different rubber. compositions, but it is preferable that the modulus of elasticity be between about 8 MPa and 14 MPa. If identical rubber compositions are used, then tire 100 will have only a single crescent shaped reinforcing member (not illustrated). For the material properties disclosed herein, modulus of elasticity means the elastic tensile modulus at 10% elongation.

The preferred path of carcass 110 will now be defined making reference to section views of the sidewall and bead portions of the tire as shown in FIGS. 3a, 3b and 3c. As previously disclosed, the maximum extent of carcass tensile stress is obtained when the carcass is disposed outwardly of the neutral bending axis of that carcass structure. In this instance outwardly refers to the origin point of the radius of curvature of the neutral axis. For the carcass path about to be specified, the position of the neutral axis of bending is approximated by a median reference profile 150 comprising the locus of points corresponding to the median position between the innermost and outermost surfaces of the tire.

Three reference points, N, Z and P, on the outermost surface of the tire 100 are shown in FIGS. 3a, 3b and 3c. A fourth reference point Q defines functionally the intersection point of carcass profile 110 with the reference profile 150. A fifth reference point R defines a rim reference point as a function the nominal rim width W and nominal rim diameter D of the mounting rim. Rim reference point R has an axial coordinate W/2 measured from the tire equatorial plane and a radial coordinate D/2 measured from the axis of tire rotation as shown in FIG. 1. The spatial locations of reference points N, Z, P and R are defined for the case of a tire mounted on a rim and inflated to a nominal pressure as defined by the Tire and Rim Association of Copley, Ohio. Tread reference point N locates the junction between the tread and sidewall portions of tire 100. The position of tread reference point N is defined as the axial and radial location where a line tangent to the outermost surface of the tire makes an angle of 30° relative to the horizontal plane. Referring now to FIG. 3c, bead reference point Z is defined as the intersection of the axially outermost extent of tire 100 with a horizontal line radially offset a distance $H_z$ from the nominal radius of the mounting rim. The radial position of bead reference point Z is defined by a gap distance of about 5 mm to about 7 mm measured radially outward from the radially outermost extent of the rim flange.

Therefore, for the case of a Tire and Rim Association "J" rim profile which defines a rim flange height of 17.5 mm +/−1 mm, the offset distance $H_z$ will be about 21.5 mm to about 25.5 mm. For the specific tire design shown the figures, reference point Z corresponds to the apex formed by the intersection of the convex outermost surface to the tire sidewall portion with the concave profile in the bead portion. The curvilinear distance between reference point Z and reference point N defines the length L of sidewall portion 106.

Sidewall reference point P is located in the sidewall portion 106 in a zone about midway between bead reference point Z and tread reference point N. As illustrated in FIG. 2 both the thickness of sidewall portion 106 and the position of the carcass 110 in the sidewall are relatively invariant in this zone. Sidewall reference point P is displaced a curvilinear distance A from bead reference point Z measured along the outermost surface of the tire, and curvilinear distance A is normally between about 45% to about 65% of the total sidewall length L. At reference point P, tire 100 has an axial thickness to and carcass 110 has an axial position $t_2$ measured axially inward from the exterior surface of the tire such that $t_2 \leq t_p/2$ and, preferably that $t_2$ is about 8% to about 25% of $t_p$. At bead reference point Z tire 100 has an axial thickness $t_z$ and carcass 110 has an axial position $t_3$ measured axially inward from the exterior surface of the tire such that $t_3 \geq t_z/2$. Preferably $t_3$ is about 60% to about 80% of the axial thickness $t_z$. At the rim reference point R, tire 100 has an axial thickness $t_B$ and carcass 110 has an axial location $t_1$ measured axially inward from the outermost surface of the tire such that $t_1 \geq t_B/2$. Preferably $t_1$ is about 55% to about 85% of the total bead thickness $t_B$.

When a tire deflects by rolling under load, particularly the exaggerated deflection when rolling deflated, the deformation of the bead and lower sidewall portions will be controlled by the interaction of the tire structure with the rim flange. At a greater radial distance from the rim, tire deformation is controlled by bending in the sidewall portion. Reference point Q defines the transition point between these two modes. The location of reference point Q is a function of the axial location $t_3$ of the carcass 110 in the zone corresponding to the bead reference point Z. Referring to FIG. 3c, reference point Q is located at the intersection of median reference profile 150 with a circular arc 160 having a radius $R_z$ and an origin at bead reference point Z. Radius $R_z$ will normally be about 90% to about 120% of $t_3$ and, preferably, $R_z$ is about 100% of $t_3$. The defining elements of the carcass path 110 have now been described.

Figure 3:
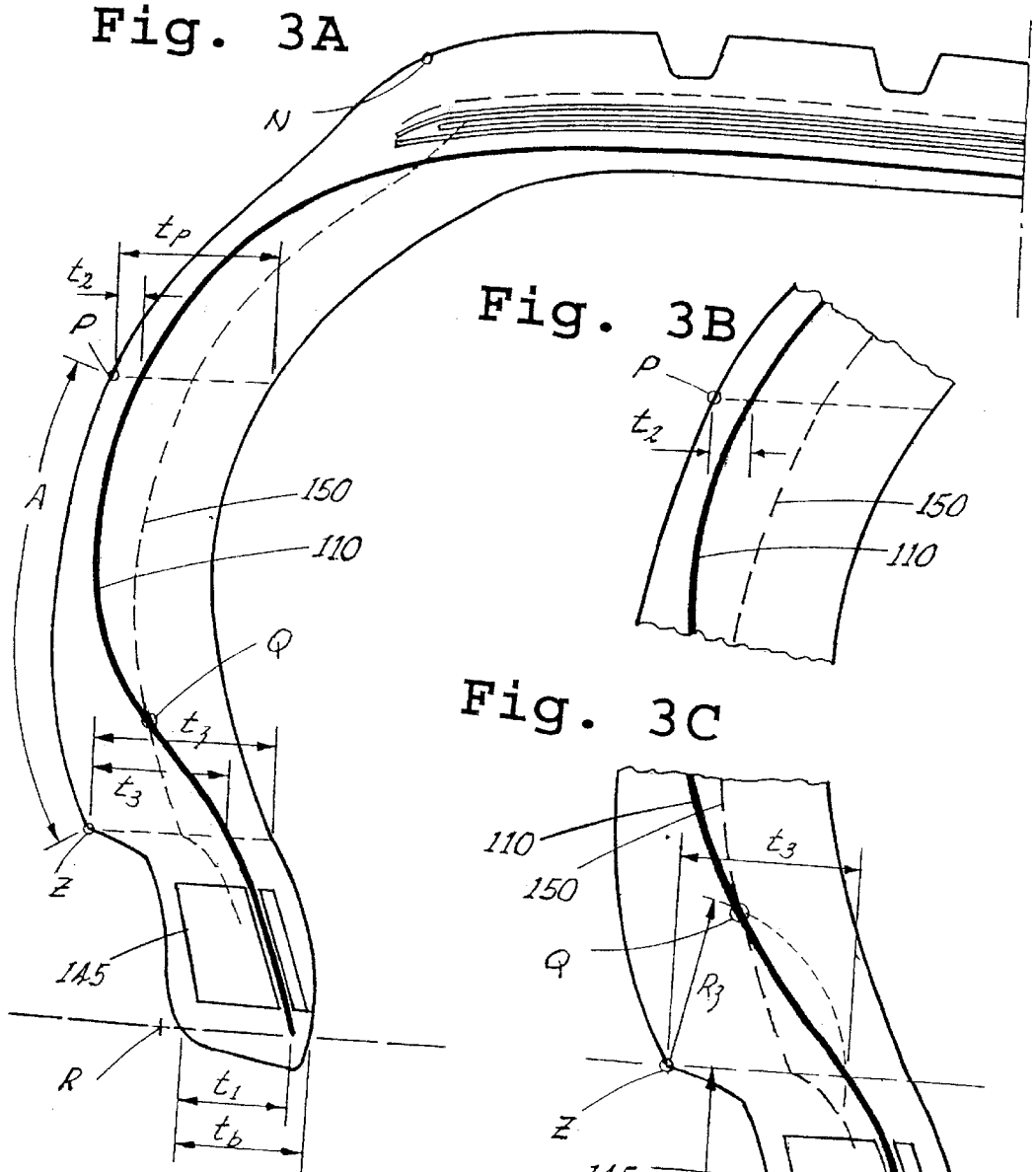
FIG. 3a is a partial cross-section view of a runflat tire corresponding to a preferred embodiment of the invention, taken along a meridian plane through the axis of rotation. Some tire components have been deleted from this view for clarity.
FIG. 3b is an enlarged view of the tire shown in FIG. 3a showing a detail of the carcass profile in the sidewall portion of the tire. Some tire components have been deleted from this view for clarity.
FIG. 3c is an enlarged view of the tire shown in FIG. 3a showing a detail of--he carcass profile in the lower sidewall and bead portions of the tire. Some tire components have been deleted from this view for clarity.

Retention of the bead on the mounting rim and ease of mounting are functions of the bead retention reinforcement 145 which is disposed axially outward from the carcass anchoring reinforcement 141 and/or 142 as shown in FIG. 3 in the enlargement of the bead portion. In this embodiment, bead retention reinforcement 145 is comprised of at least one winding of essentially circumferentially oriented cords imbedded in rubber. This embodiment of the tire makes has steel cords imbedded in rubber, in which case it is preferable that the rubber mix has a Shore A hardness greater than 70. However, it is implicit in the invention to use other reinforcing materials such as close packed steel elements, elastomeric materials or, alternatively, carbon or aramid fibers embedded in thermoplastic or thermosetting resin matrices.

Figure 4:
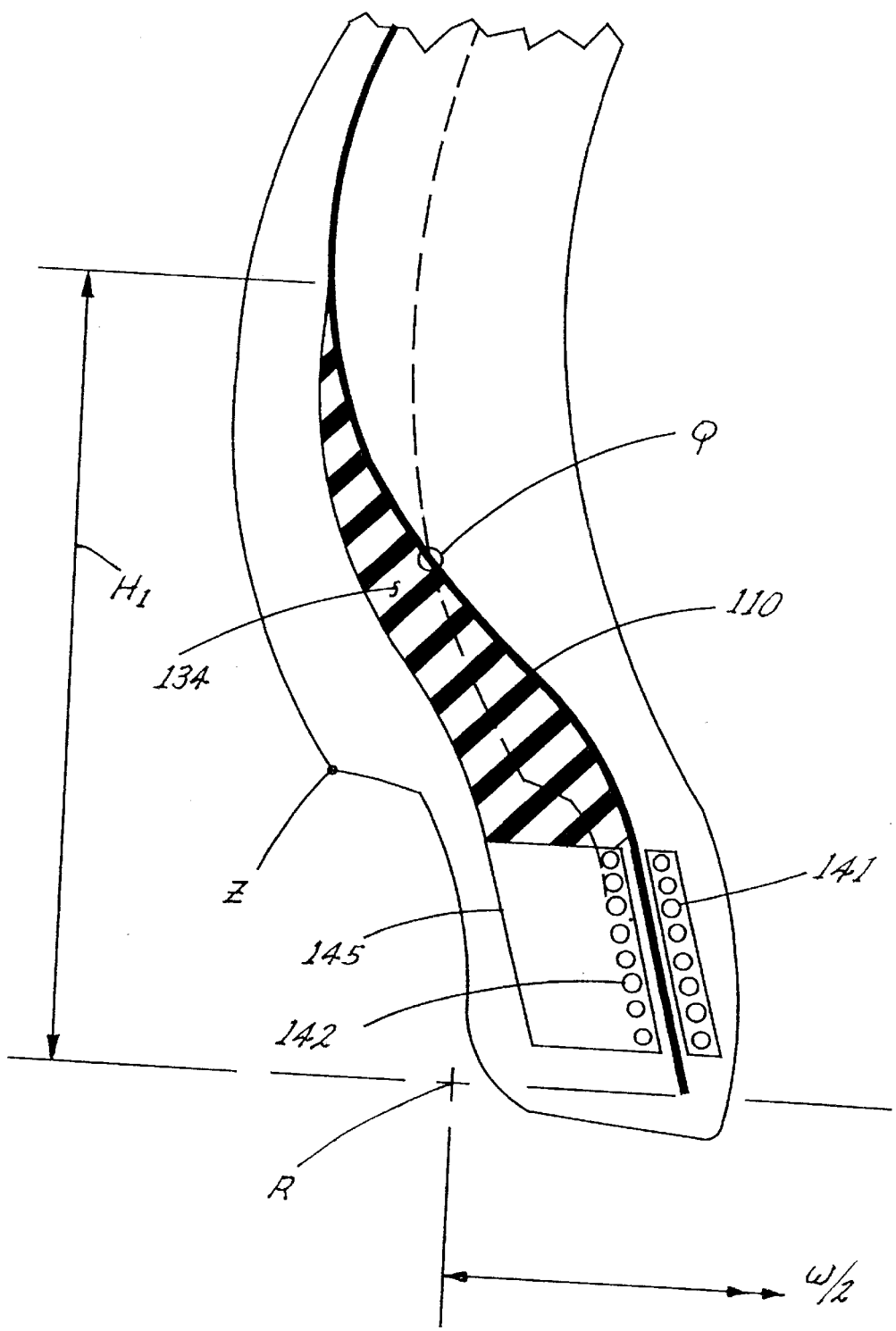
FIG. 4 is an enlarged view of the lower sidewall and bead portion of a runflat tire according to the invention, taken along a meridian plane through the axis of rotation, and showing a disposition of an elastomeric bead filler.

Located within the bead portion 107 and the radially inner portion of the sidewall 106 is an elastomeric filler 134 disposed axially outward of the carcass 110 as illustrated in FIG. 4a. The filler 134 extends from the radially outer extent of the bead retention reinforcement 145 radially upward into the sidewall 106 and gradually decreasing in axial section width. The filler 134 extends radially a distance $H_1$ above the rim reference point. $H_1$ is preferably about 130% to about 170% of the radial distance between rim reference point R and point Q. In this embodiment $H_1$ is preferably about 150% of the radial distance between rim reference point R and point Q. Bead filler 134 is comprised of an elastomeric material having a modulus of elasticity of about 60 MPa and may include supplemental reinforcement embedded in the elastomer.

Figure 5A:
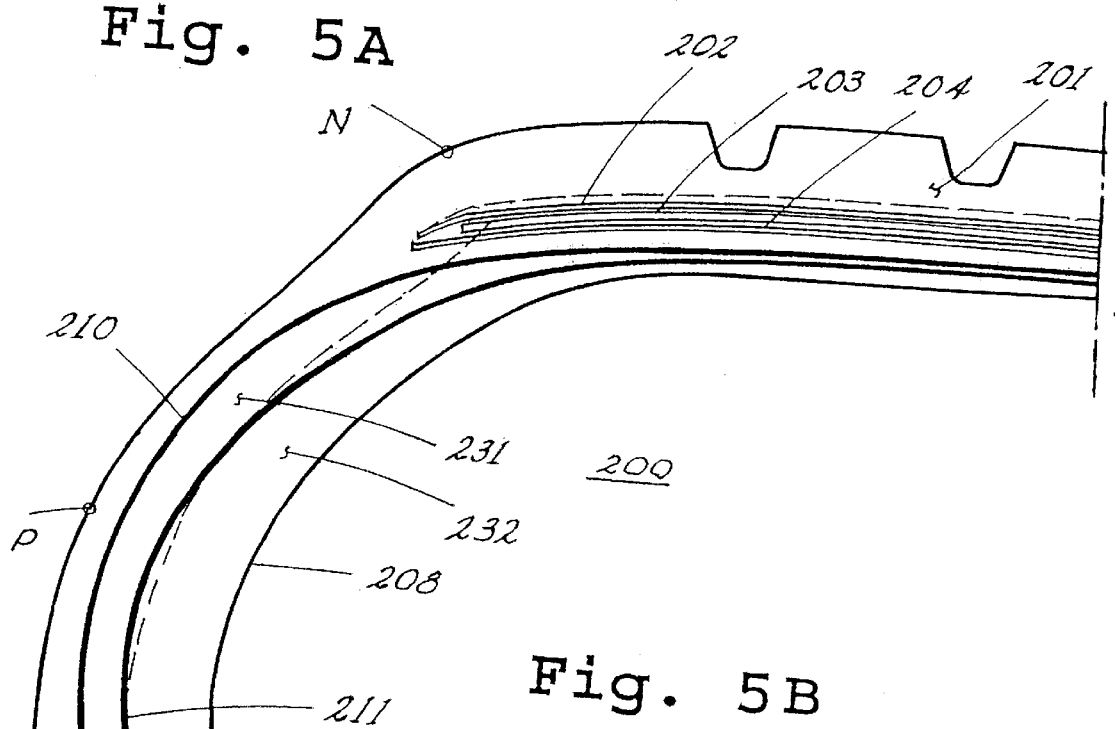
FIG. 5a is a partial cross-section view of a runflat tire corresponding to a second embodiment of the invention, taken along a meridian plane through the axis of rotation, and having two carcasses.

In a second embodiment of the invention, as shown in FIG. 5a, the tire 200 of the invention is comprised of at least two carcasses 210 and 211. Carcass 210 has a path similar to that of carcass 110 of tire 100 as described in the first embodiment of the invention. Second carcass 211 is posed axially inward from first carcass 210 and has a profile in the sidewall 206 tracing approximately midway between carcass 210 and the interior surface 208 of the tire. An inspection of FIG. 5a reveals that the profile of second carcass 211 in sidewall portion 206 is approximately coincident with the median axis of tire 200 in the upper sidewall portion radially outward from reference point P. A first crescent shaped reinforcing member 231 is disposed between first carcass 210 and second carcass 211, and a second crescent shaped reinforcing member 232 is disposed between second carcass 211 and the innermost surface 208 of the tire. At its radially innermost extent in bead portion 207, second carcass 211 has an adjacent circumferential alignment with first carcass 210. In this embodiment carcasses 210 and 211 are anchored in the bead by first, second and third windings of circumferential cord reinforcement 241, 242 and 243, respectively. These windings of. circumferential cord reinforcement are disposed axially with respect to carcasses 210 and 211 as illustrated in FIG. 5a. To insure improved retention of the bead on the rim and ease of mounting, a bead retention reinforcement 245 is disposed axially outward of reinforcement winding 242. An elastomeric bead filler 234 is disposed axially outward of first carcass 210 and radially outward of bead retention reinforcement 245. The filler 234 extends from the radially outer extent of the bead retention reinforcement 245 radially upward into the sidewall 206 and gradually decreasing in axial section width. Carcass reinforcing materials as specified for the first embodiment may also be used for this two carcass tire, however there is no necessity for the carcasses to be of the same material.

Figure 5B:
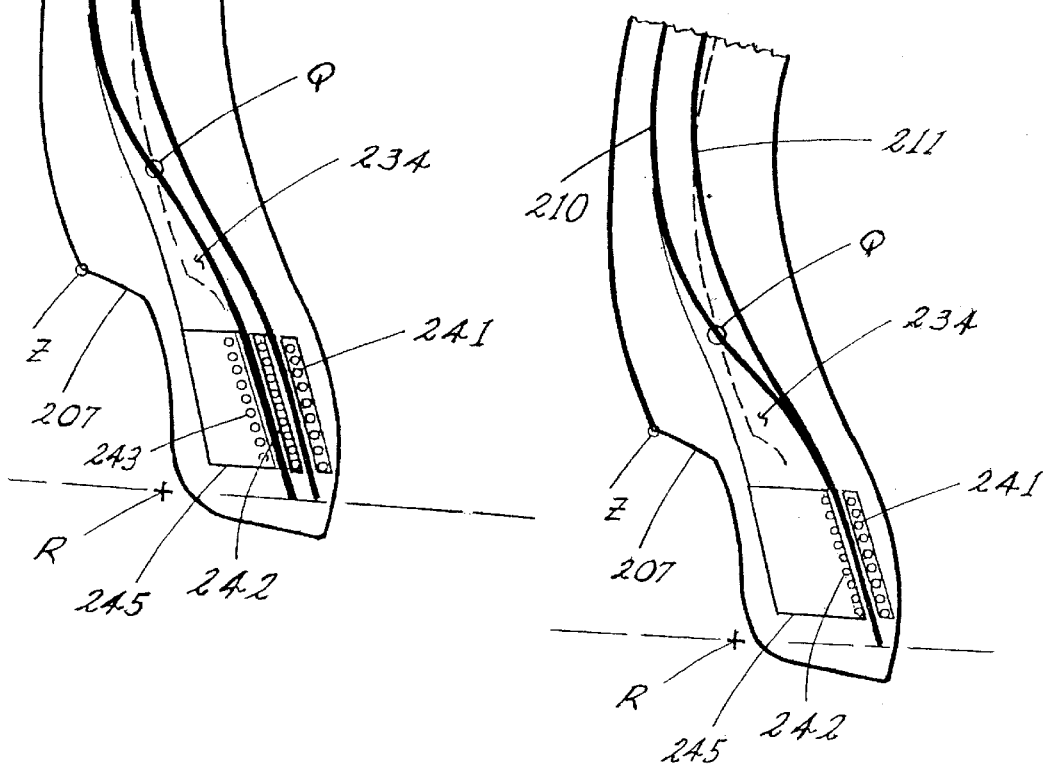
FIG. 5b is a partial cross-section view of the bead portion of a runflat tire corresponding to a second embodiment of the invention, taken along a meridian plane through the axis of rotation, and having two carcasses with a common circumferential alignment in the bead.

FIG. 5b shows a variant of this embodiment wherein the first and second carcasses have a common circumferential alignment in the bead. In this instance, the first carcass 210 can have the same tension maximizing profile as for tire 100 of the first embodiment. In this variant carcasses 210 and 211 are anchored in the bead by at least windings 241 and 242 of circumferential cord reinforcement.

Figure 6:
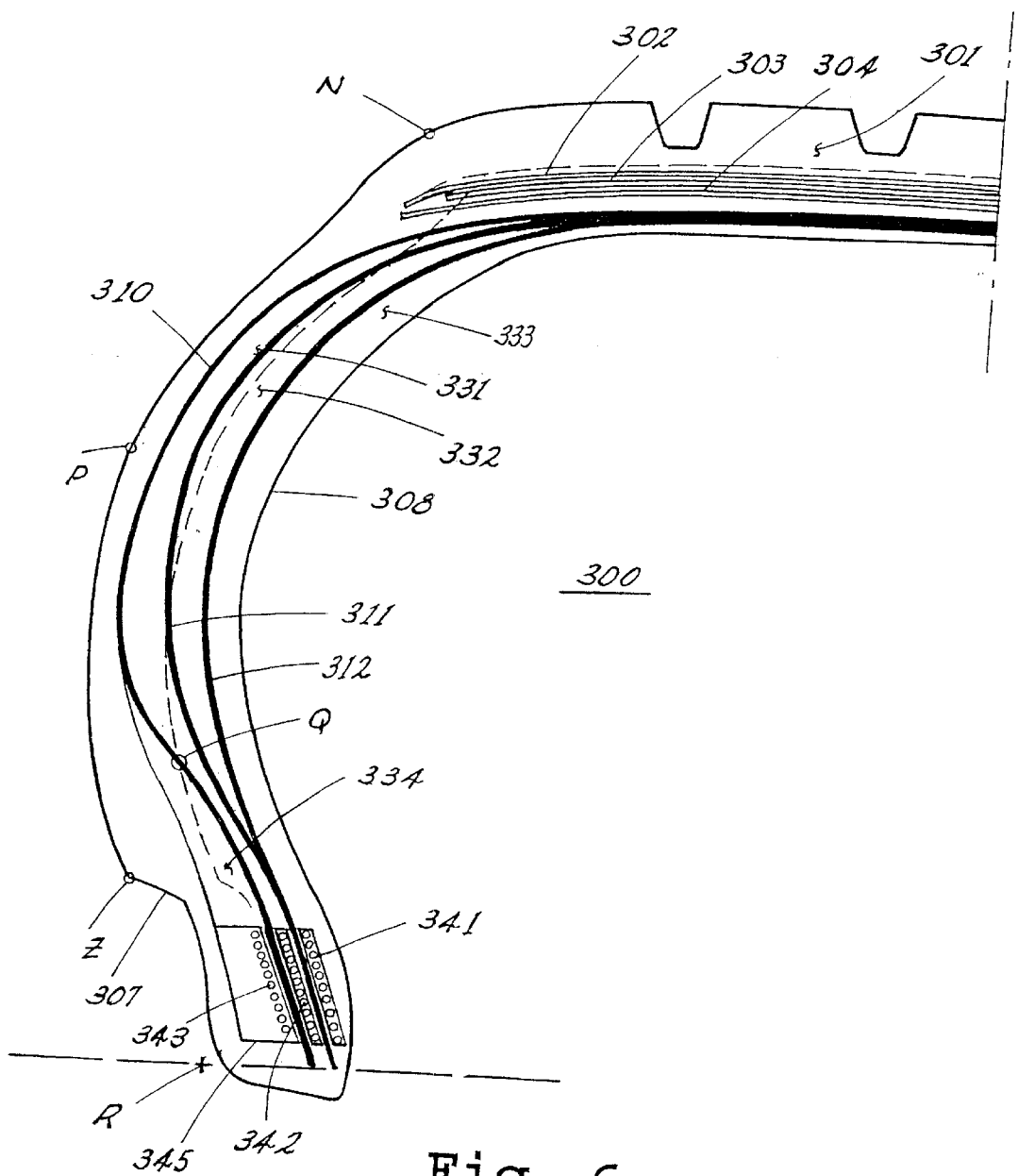
FIG. 6 is a partial cross-section view of a runflat tire corresponding to a third embodiment of the invention, taken along a meridian plane through the axis of rotation, and having three carcasses.
Figure 7:
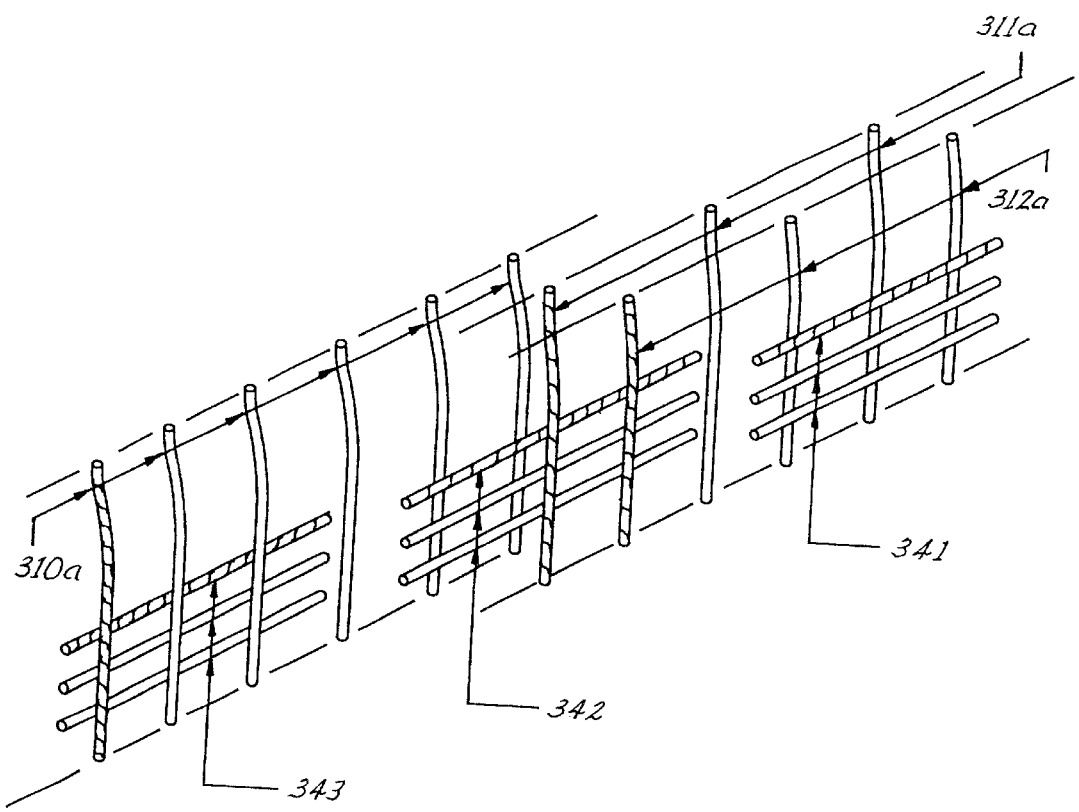
FIG. 7 is an enlarged perspective view of the bead portion of a of a runflat tire corresponding to a third embodiment of the invention showing the common circumferential disposition of the second and third carcass layers.

In a third embodiment of the invention, as illustrated in FIG. 6, tire 300 has three carcasses 310, 311 and 312. First carcass 310 is disposed axially outermost and has a path in sidewall portion 306 according to the specification given for the first embodiment. Second and third carcasses 311 and 312 are respectively disposed axially inward of first carcass 310. Likewise, three crescent shaped reinforcing members, 331, 332 and 333, are disposed respectively between the first and second carcasses 310 and 311, between second and third carcasses 311 and 312 and between third carcass 312 and the innermost surface 308 of tire 300. The function of anchoring three carcasses in the bead is met in this embodiment by disposing the radially innermost extents of the second and third carcasses in a common circumferential alignment in the bead. The cord density in the anchoring zone is fixed by the requirement of a maximum cord density for proper adhesion and bead endurance. Thus as shown in FIG. 7 the cord densities in each of second carcass 311 and third carcass 312 are less than the total cord density in the anchoring area. For example if the carcasses 311 and 312 are respectively formed by alternating cords, then the average density of the respective carcasses will be one half the cord density in the anchoring area. This structure gives the beneficial result of a tire of lower overall mass and reduced axial thickness in the bead. Other arrangements having unequal cord densities are also possible. For example, second and third carcasses may have reduced cord densities without having a common circumferential alignment in the bead. Carcass reinforcing materials as specified for the first embodiment may also be used for this three carcass tire, however there is no necessity for the carcasses to be of the same material.

Conventional tires with carcasses turned up around beads may also have reduced cord density in the supplemental carcasses. However, since these conventional tires are constructed by superposing multiple layers of rubberized textile fabric, they do not have the common circumferential alignment of the carcasses in the bead. The result is a bead of increased axial thickness where the first carcass layer is displaced axially outward in the bead to an extent that the preferred path of the outermost carcass cannot be achieved.

The common circumferential alignment of the second and third carcasses of the present invention allows all carcass layers to be positioned to a greater axially inward extent than in a tire without such a common alignment. The second and third carcasses are laterally bordered by windings of circumferential cord reinforcement 341 and 342 respectively. The disposition of the radially innermost extent of first carcass 310 is axially bordered by windings of circumferential cord reinforcement 342 and 343 as shown in FIG. 6. Bead portion 306 may also include bead retention reinforcement 345 and a bead filler 334.

What is claimed:

1. A tire comprising at least one carcass anchored in each side of the tire in a bead, the bead having a base which is intended to be mounted on the tire's design mounting rim, each bead being extended radially upward by a sidewall portion, the sidewall portions joining a tread portion, wherein when the tire is mounted on the design rim and inflated to the tire's nominal pressure, a median reference profile is defined by the locus of points corresponding to the median position between the axially innermost surface and the axially outermost surface of the tire, a rim reference point R in said bead is defined having an axial coordinate measured from the tire equatorial plane equal to one half the nominal width of the mounting rim and a radial coordinate measured from the axis of tire rotation equal to one half the nominal diameter of the mounting rim, a bead reference point Z is defined as the intersection of the outermost surface of the tire with a horizontal line offset radially outward a distance from the radial coordinate of the rim reference point R, a tread reference point N is defined on the outermost surface of the tire at the junction between the tread and sidewall portions of the tire, a sidewall reference point P is defined on the outermost surface of the sidewall of the tire and located between said reference points Z and N;

wherein an axially outermost carcass is disposed axially outward of said median reference profile at radial positions between said sidewall reference point P and said tread reference point N, wherein said axially outermost carcass intersects said median reference profile at a point Q and said point Q has a radial position between said reference point Z and said reference point P, said axially outermost carcass thereafter being disposed axially to the interior of said median reference profile at radial positions inward of said point Q;

wherein each axial coordinate of said axially outermost carcass has a corresponding unique radial coordinate at each radial position inward of said sidewall reference point P, and said tire further comprises a first bead reinforcement anchoring said at least one carcass in the beads and a second bead reinforcement providing retention of the beads on the mounting rim in a deflated condition of the tire.

2. The tire according to claim 1 wherein said sidewall reference point P is located at about 45% to about 65% of the curvilinear distance measured from said bead reference point Z to said tread reference point N.

3. The tire according to claim 2 wherein the axial position of said outermost carcass at said sidewall reference point P measured axially inward from the outermost surface of said tire is about 8% to about 25% of the total distance between the axially outermost and axially innermost surfaces of said tire.

4. The tire according to claim 1 wherein the radial position of said bead reference point Z is between about 21.5 mm to about 25.5 mm radially outward from rim reference point R.

5. The tire according to claim 4 wherein the axial position of said outermost carcass at said bead reference point Z is about 60% to about 80% of the total distance between the axially outermost and axially innermost surfaces of said tire measured axially inward from the outermost surface of said tire.

6. The tire according to claim 1 wherein said point Q is located at the intersection of said median reference profile with a circular arc having an origin at said bead reference point Z and a radius between about 90% to about 120% of the axial distance between the outermost surface of said tire and the axial position of said outermost carcass measured at said bead reference point Z.

7. The tire according to claim 1 wherein the axial position of said outermost carcass at said reference point R is between about 55% to about 85%, of the total thickness between the axially outermost and axially innermost surfaces of said tire, measured axially inward from the outermost surface of said tire.

8. The tire according to claim 1 wherein said first bead reinforcement axially orders said at least one carcass on at least one side in the axial direction, said first bead reinforcement including at least one winding of circumferentially oriented cords taking up the tension developed in the carcass during inflated or deflated use of the tire.

9. The tire according to claim 1 wherein said second bead reinforcement is disposed axially outward of said at least one carcass and said first bead reinforcement and having at least one winding of essentially circumferentially oriented cords imbedded in a rubber mix having a Shore A hardness greater than 70.

10. The tire according to claim 1, wherein said bead further comprises an elastomeric filler disposed axially outward of said axially outermost carcass, said filler having a radially outermost extent above said rim reference point R and a radially innermost extent at said first bead reinforcement, and said filler having a modulus of elasticity of about 60 MPa.

11. The tire according to claim 10 wherein the radially outermost extent of said filler is between about 130% to about 170% of the radial distance between said rim reference point R and said point Q.

12. The tire according to claim 1 wherein at least one crescent shaped runflat reinforcing member is disposed between said carcass and the innermost surface of said tire, and said at least one crescent shaped runflat reinforcing member has a modulus of elasticity between about 8 MPa to about 14 MPa.

13. The tire according to claim 1 which further comprises a second carcass disposed axially inward from said axially outermost carcass, and having first and second crescent shaped runflat reinforcing members, said first crescent shaped runflat reinforcing member being disposed between said axially outermost carcass and said second carcass, and said second crescent shaped runflat reinforcing member being disposed between said second carcass and the innermost surface of said tire.

14. The tire according to claim 13 wherein said carcasses have a common circumferential alignment in the bead.

15. The tire according to claim 13 wherein said first and second crescent shaped runflat reinforcing members have a modulus of elasticity of between about 8 MPa to about 14 MPa.

16. The tire according to claim 13 which further comprises a third carcass disposed axially inward from said second crescent shaped runflat reinforcing member and, and having a third crescent shaped runflat reinforcing member disposed between said third carcass and said innermost surface of the tire.

17. The tire according to claim 16 wherein said third crescent shaped runflat reinforcing member has a modulus of elasticity of between about 8 MPa to about 14 MPa.

18. The tire according to claim 16 wherein said second and third carcasses have a common circumferential alignment in the bead.

19. The tire according to claim 13 wherein the circumferential cord densities of both said second carcass and said third carcass are less than the circumferential cord density of said first carcass.

20. The tire according to claim 13 wherein the circumferential cord densities of both said second carcass and said third carcass are equal to one half the circumferential cord density of said first carcass.

21. A runflat tire comprising at least first second, and third carcass layers anchored in each side of said tire in a bead, said bead having a base which is intended to be mounted on the tire's design mounting rim, each bead being extended radially upward by a sidewall portion, the sidewall portions joining a tread portion wherein when the tire is mounted on the design rim and inflated to the tire's nominal pressure,

- a median reference profile is defined by the locus of points corresponding to the median position between the axially innermost surface and the axially outermost surface of the tire,
- a rim reference point R in said bead is defined having an axial coordinate measured from the tire equatorial plane equal to one half the nominal width of the mounting rim and a radial coordinate measured from the axis of tire rotation equal to one half the nominal diameter of the mounting rim,
- a bead reference point Z is defined as the intersection of the outermost surface of the tire with a horizontal line offset radially outward a distance from the radially outermost external radial coordinate of the mounting rim flangel rim reference point R,
- a tread reference point N is defined on the outermost surface of the tire at the junction between the tread and sidewall portions of the tire,
- a sidewall reference point P is defined on the outermost surface of the sidewall of the tire and located between said reference points Z and N;
- said first carcass being disposed axially outward of said second and third carcasses and axially outward of said median reference profile at radial positions between said sidewall reference point P and said tread reference point N,
- wherein said first carcass intersects said median reference profile at a point Q said point Q having a radial position between said reference point Z and said sidewall reference point P, and thereafter being disposed axially to the interior of said median reference profile at radial positions inward of said point Q, and
- wherein each axial coordinate of said carcasses has a corresponding unique radial coordinate at each radial position inward of said sidewall reference point P,
- said second and third of said carcass layers being disposed axially inward of said first carcass layer and said second and third carcass layers having a common circumferential alignment in the bead,
- said tire further comprises at least a first, a second, and a third crescent shaped runflat reinforcing members, said first crescent shaped runflat reinforcing member being disposed between said first carcass and said second carcass, said second crescent shaped runflat reinforcing member being disposed between said second carcass and said third carcass and said third crescent shaped runflat reinforcing member being disposed between said third carcass and said innermost surface of the tire, and,
- said tire further comprises a first bead reinforcement anchoring said carcasses in the beads and a second bead reinforcement providing retention of the beads on the mounting rim in a deflated condition of the tire.

22. The tire according to claim 21 wherein the circumferential cord densities of both said second carcass and said third carcass are less than the circumferential cord density of said first carcass.

23. The tire according to claim 22 wherein the circumferential cord densities of both said second carcass and said third carcass are equal to one half the circumferential cord density of said first carcass.

24. The tire according to claim 21 wherein said crescent shaped runflat reinforcing members have a modulus of elasticity between about 8 MPa and about 14 MPa.

* * * * *